(12) United States Patent
Levacov et al.

(10) Patent No.: US 9,787,356 B2
(45) Date of Patent: Oct. 10, 2017

(54) SYSTEM AND METHOD FOR LARGE DIMENSION EQUALIZATION USING SMALL DIMENSION EQUALIZERS

(71) Applicant: FREESCALE SEMICONDUCTOR, INC., Austin, TX (US)

(72) Inventors: Igor Levacov, Beer Sheva (IL); Haim Bareket, Rehovot (IL); Roi Menahem Shor, Tel-Aviv (IL)

(73) Assignee: NXP USA, Inc., Austin, TX (US)

( * ) Notice: Subject to any disclaimer, the term of this patent is extended or adjusted under 35 U.S.C. 154(b) by 57 days.

(21) Appl. No.: 14/861,354

(22) Filed: Sep. 22, 2015

(65) Prior Publication Data

US 2017/0085294 A1    Mar. 23, 2017

(51) Int. Cl.
| | |
|---|---|
| *H03H 7/30* | (2006.01) |
| *H03H 7/40* | (2006.01) |
| *H03K 5/159* | (2006.01) |
| *H04B 3/14* | (2006.01) |
| *H04B 7/0413* | (2017.01) |

(52) U.S. Cl.
CPC ............. *H04B 3/14* (2013.01); *H04B 7/0413* (2013.01)

(58) Field of Classification Search
CPC ................................. H04B 3/14; H04B 7/0413
See application file for complete search history.

(56) References Cited

U.S. PATENT DOCUMENTS

| | | | | |
|---|---|---|---|---|
| RE42,219 E | * | 3/2011 | Schilling | H04B 1/7115 375/141 |
| 8,634,351 B2 | | 1/2014 | Aue et al. | |
| 2003/0063663 A1 | * | 4/2003 | Bryant | H04L 25/03885 375/229 |

(Continued)

FOREIGN PATENT DOCUMENTS

EP        2363986 A1    9/2011

OTHER PUBLICATIONS

Baracca et al., "Per Sub-Block Equalization of Very Long OFDM Blocks in Mobile Communications," in IEEE Transactions on Communications, vol. 59, No. 2, pp. 363-368, Feb. 2011.*

(Continued)

*Primary Examiner* — Daniel Washburn
*Assistant Examiner* — Amneet Singh (57) ABSTRACT

An equalizer includes an equalizer circuit including a signal input to receive a first frequency-domain signal, another signal input to receive a second frequency-domain signal, and an equalized signal output to provide a first equalized signal based upon the first and second frequency-domain signals. Another equalizer circuit includes a signal input to receive a third frequency-domain signal, another signal input to receive a fourth frequency-domain signal, and an equalized signal output to provide a second equalized signal based upon the third and fourth frequency-domain signals. A third equalizer circuit includes a signal input coupled to the equalized signal output of the first equalizer circuit to receive the first equalized signal, another signal input (Continued)

coupled to the equalized signal output of the second equalizer circuit to receive the second equalized signal, and an equalized signal output to provide a third equalized signal based upon the first and second equalized signals.

17 Claims, 5 Drawing Sheets

(56) References Cited

U.S. PATENT DOCUMENTS

| | | | | |
|---|---|---|---|---|
| 2003/0076908 A1* | 4/2003 | Huang | ............... | H04B 7/0891 375/350 |
| 2003/0152174 A1* | 8/2003 | Burke | ............... | H04B 1/7097 375/349 |
| 2005/0053172 A1* | 3/2005 | Heikkila | ........... | H04B 1/71057 375/333 |
| 2006/0233223 A1* | 10/2006 | Pan | ................. | H04B 1/71052 375/147 |
| 2007/0053416 A1* | 3/2007 | Li | ..................... | H04B 1/0003 375/147 |
| 2007/0183517 A1* | 8/2007 | Liu | ................... | H04L 25/03171 375/260 |
| 2007/0293147 A1* | 12/2007 | Gagnon | ............... | H04B 3/14 455/3.06 |
| 2008/0043827 A1* | 2/2008 | Renfors | ............... | H04B 3/14 375/230 |
| 2009/0129456 A1* | 5/2009 | Miyatani | ........... | H04L 25/0246 375/232 |
| 2009/0220032 A1* | 9/2009 | Rosenqvist | ......... | H04B 1/7103 375/340 |
| 2013/0294494 A1* | 11/2013 | Wang | ................ | H04B 1/71055 375/233 |

OTHER PUBLICATIONS

Y. Nasser, J. F. Helard, M. Crussiere and O. Pasquero, "Efficient MIMO-OFDM Schemes for Future Terrestrial Digital TV with Unequal Received Powers," 2008 IEEE International Conference on Communications, Beijing, 2008, pp. 2021-2027.*

M. Mendicute, J. Altuna, J. Thompson and V. Atxa, "Performance of frequency-domain MIMO equalization for cyclic-prefixed single-carrier spatial multiplexing," 2004 12th European Signal Processing Conference, Vienna, 2004, pp. 1849-1852.*

Jelitto, J. et al., "Reduced Dimension Space-Time Processing for Multi-Antenna Wireless Systems," IEEE Wireless Communications, Dec. 2002; pp. 18-25.

Non-Final Office Action mailed Dec. 5, 2016 for U.S. Appl. No. 15/078,021, 12 pages.

Notice of Allowace mailed Mar. 1, 2017 for U.S. Appl. No. 15/078,021, 10 pages.

* cited by examiner

SYSTEM AND METHOD FOR LARGE DIMENSION EQUALIZATION USING SMALL DIMENSION EQUALIZERS

FIELD OF THE DISCLOSURE

This disclosure generally relates to wireless communication of high-speed data, and more particularly relates to a system and method for large dimension equalization using small dimension equalizers in a wireless communication network.

BACKGROUND

High-speed wireless data communication networks form the basis for cellular and mobile communications, and have become increasingly important in expanding access and availability to the rich functions, features, and capabilities that are associated with smart phones and connected tablet devices. High-speed data communication networks evolved through second generation (2G) wireless networks and third generation (3G) wireless networks into the current fourth generation (4G) wireless networks such as Long Term Evolution (LTE) and LTE-Advanced (LTE-A) networks and Wireless Metropolitan Area Networks (MAN)-Advanced networks. In the future, fifth generation (5G) networks such as Cloud-Radio Access Network (C-RAN), Coordinated Multi Point (CoMP), and future $3^{rd}$ Generation Partnership Project (3GPP) will add enhanced capabilities to support a broad range of communication, media, and computing capabilities as will be needed for the features of the future.

The later generation (4G and 5G) wireless network technologies have adopted Multiple-Input and Multiple-Output (MIMO) transmission technology that uses multiple transmit and receive antennas to exploit multipath signal propagation, in order to increase bandwidth and improve reliability. MIMO technology provides the transmission of a common set of information over multiple radio channels in order to take advantage of the variations in signal paths between the transmit and receive antennas to improve the transmission of the information. For example, the LTE (4G) network technology calls for up to eight antennas. The upcoming 4G releases and next generation 5G network technologies under development will utilize Massive-MIMO arrays of 16, 24, and more antennas. One challenge created by the use of Massive-MIMO is the need to equalize the signals received from the individual antennas to account for differences in the phase shift and loss associated with the different channels, especially as the number of antennas in the MIMO array increases.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

A high-speed wireless data communication network can include a MIMO receiver that receives radio signals transmitted from a MIMO transmitter. The MIMO transmitter encodes data into a radio signal that is transmitted to the MIMO receiver by a plurality of antennas. The MIMO receiver converts each of the radio signals received at each antenna from time domain signals to frequency-domain signals using a Fast Fourier Transform (FFT), and the frequency-domain signals are equalized in order to reverse the effects of distortion in the channels between the transmitter antennas and the receiver antennas. The equalized signals are then further processed to recover the data encoded.

An equalizer according to an embodiment of the present disclosure equalizes the signals received by a MIMO array by utilizing multiple equalizer circuits configured in two or more equalization stages. In an initial stage, a plurality of equalizer circuits are each configured to receive frequency-domain signals from a subset of the antennas of the MIMO array, along with channel characteristic information associated with each of the received frequency-domain signals. The initial stage equalizer circuits each equalize their set of received the frequency-domain signals based upon the frequency-domain signals themselves and the channel characteristic information corresponding to the signals' channels, and generate an initial stage equalized signal and associated initial stage output statistics.

In a next stage, one or more equalizer circuits are connected to receive a number of the initial stage equalized signals and the initial stage output statistics associated with each received initial stage equalized signal. These next stage equalizer circuits then equalize the initial stage equalized signals based upon the initial stage equalized signals and the initial stage output statistics, and generate a next stage equalized signal and associated next stage output statistics. In each additional equalization stage, one or more equalization circuit are connected to receive a number of equalized signals and the associated output statistics from the preceding equalization stage. The equalization circuits each equalize the received signals based upon the received signals and associated output statistics to generate an equalized signal and associated output statistics for a subsequent equalization stage. Thus, additional equalization stages are utilized to further decrease the number of equalized signals until, in a final equalization stage, a single final stage equalized signal is generated. The final stage equalized signal is utilized in data recovery operations of the receiver. In this way, a number of simple equalizer circuits are utilized in stages to equalize the frequency-domain signals from a large number of antennas, instead of designing and implementing a single equalizer that is capable of equalizing all of the radio signals in a single operation.

Figure 1:
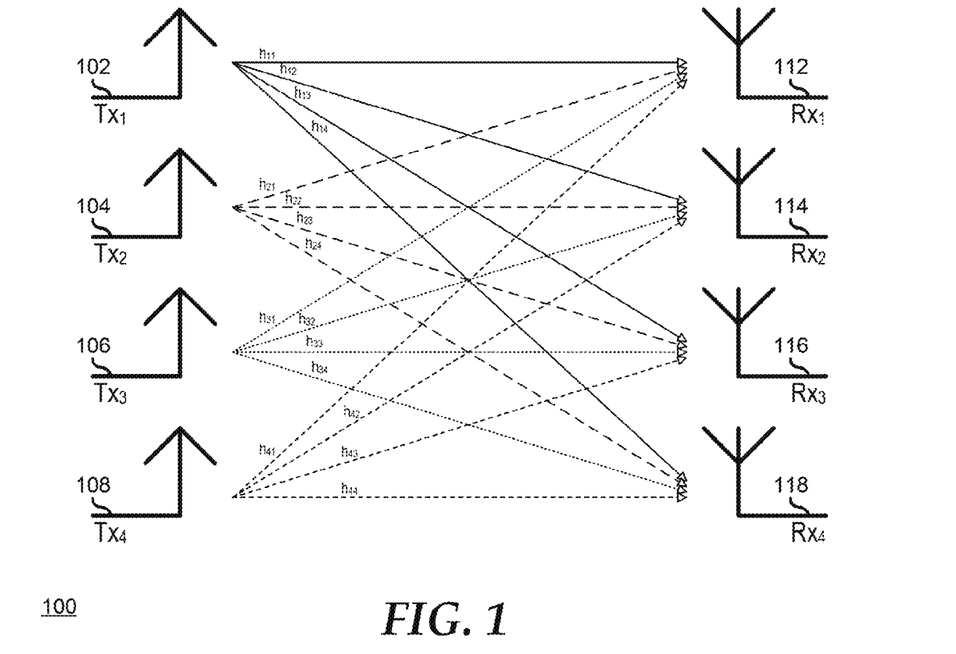
FIG. 1 is an illustration of a MIMO system according to an embodiment of the present disclosure.

FIG. 1 illustrates a MIMO system 100 including four transmit antennas 102, 104, 106, and 108, and four receive antennas 112, 114, 116, and 118. In a particular embodiment, a transmitter of MIMO system 100 operates using Orthogonal Frequency-Division Multiplexing (OFDM) to transmit a time-domain radio signal that encodes a particular set of symbols representing digital data over a plurality of transmit antennas 102-108. A receiver of MIMO system 100 includes receive antennas 112-118, each of which provide a corresponding time-domain radio signal to the receiver for further processing to decode the particular set of symbols and retrieve the digital data. Each transmit antenna 102-108 is coupled to each of receive antennas 112-118 via a unique channel. Each channel, here represented by "$h_{ij}$," represents a model of the transmission path that is unique to the antenna pair represented by the channel. Transmit antenna 102 is coupled to receive antenna 112 via channel $h_{11}$, to receive antenna 114 via channel $h_{12}$, to receive antenna 116 via channel $h_{13}$, and to receive antenna 118 via channel $h_{14}$. Receive antennas 104-108 are similarly coupled to each of receive antennas 112, 114, 116, and 118. Note that a particular radio signal is characterized by its carrier frequency and its bandwidth, and that a radio signal that uses OFDM will divide the bandwidth into multiple frequency sub-bands. The frequency-domain representation of the time-domain signal that is received by each of receive antennas 112-118 is given generally as:

$$\bar{y} = H\bar{x} + \bar{n} \qquad \text{Equation 1}$$

where $\bar{y}$ is the frequency domain representation of the received signal, represented by the frequency-domain vector [Rx×1], H is the channel matrix, represented by the frequency-domain vector [Rx×Tx], x is the frequency domain representation of the transmitted signal, e.g., the idealized signal, represented by the frequency-domain vector [Tx×1], and $\bar{n}$ is the noise in the receiver.

The channel matrix H includes signal path characteristic information that distorts the idealized signal $\bar{x}$, such that its inverse can be used to correct the received signals when the characteristics of i are known. The signal path characteristics represent the combined effects of, for example, scattering, fading, and power decay with distance. The channel matrix H can be determined via various techniques as are known in the art, such as where channel characteristic information is derived from channel measurements taken at the receiver in response to a received channel training sequence, or pilot signal, that includes known signal characteristics. The channel characteristic information is derived by comparing the known signal characteristics of the training sequence with the signal characteristics of the received signal to determine the signal path characteristics. The channel matrix H can also be obtained based on various channel estimation techniques. The techniques and method for deriving channel characteristic information is known in the art. It will be understood that each channel is characterized by its own channel matrix H, and that the channel matrix will include channel characteristic information associated with each frequency sub-band.

It will be understood that, with the increased use of Massive-MIMO, the number of antenna signals that will need to be equalized will increase as compared to previous systems. As such, the design and development of massively parallel equalizer circuits will become an increasing challenge. In a particular embodiment of the present disclosure, a multi-stage equalizer meets this challenge by utilizing multiple stages of lower order equalizer circuits to perform analogous functions to a single, higher order, hardware equalizer. For example, where a typical equalizer circuit can equalize eight (8) antenna signals, eight (8) of such equalizer circuits can be used to perform a first stage of equalization on up to 64 antenna signals to generate eight first stage equalized signals. Then another equalizer circuit can receive the eight first stage equalized signals and perform a second stage of equalization to generate a final equalized signal for all 64 antenna signals.

Figure 2:
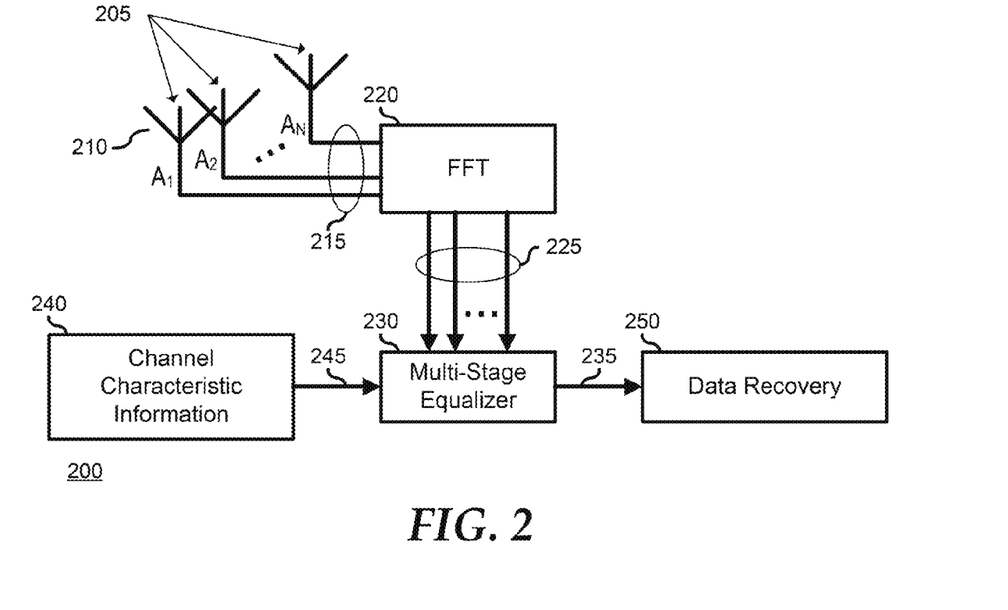
FIG. 2 is an block diagram illustrating a MIMO receiver for a high-speed wireless data communication network according to an embodiment of the present disclosure.

FIG. 2 illustrates an embodiment of a MIMO receiver 200 for a high-speed wireless data communication network, such as may be found in a LTE uplink receiver base station. Receiver 200 includes a MIMO array 210, a Fast Fourier Transform (FFT) circuit 220, a multi-stage equalizer 230, a channel characteristic information module 240, and a data recovery module 250. Radio signals 205 encode symbols representative of high-speed digital data from a MIMO transmitter. MIMO array 210 represents a number of receive antennas that each receive radio signals 205 and provide time-domain signals 215 to FFT circuit 220. As such, MIMO array 210 will be understood to include various analog devices such as amplifiers, mixers, phase shifters, and the like, as needed or desired. Time-domain signals 215 are received by FFT circuit 220 and are transformed into associated frequency-domain signals 225. Here a first time-domain signal 215 received on a first antenna of MIMO array 210 is transformed via FFT circuit 220 into an associated first frequency-domain signal 225, and each other time-domain signal is transformed into an associated frequency-domain signal. Frequency-domain signals 225 are equalized in multi-stage equalizer 230 based upon channel characteristic information 245 from channel characteristic information module 240, and the multi-stage equalizer generates an equalized signal 235 based upon the frequency-domain signals and the channel characteristic information. Equalized signal 235 is provided to data recovery module 250 to decode symbols and extract the high-speed digital data encoded thereon. As such, data recovery module 250 operates to apply various signal processing techniques to equalized signal 235, including Inverse Digital Fourier Transform (IDFT), Log Likelihood Ratio (LLR) generation, Hybrid Automatic Repeat Request (HARQ) combining, turbo encoding, and the like.

Channel characteristic information module 240 includes information related to the signal path characteristics of radio signals 205 as they propagate from the MIMO transmitter to MIMO receiver 100. The signal path characteristics represent the combined effects of, for example, scattering, fading, and power decay with distance. Channel characteristic information module 240 provides channel characteristic information 245 to multi-stage equalizer 230. In a particular embodiment, channel characteristic information module 240 derives the channel characteristic information based upon channel training sequence. In another embodiment, channel characteristic information module 240 determines the channel characteristic information based upon an ongoing estimate of the signal path characteristics.

Figure 3:
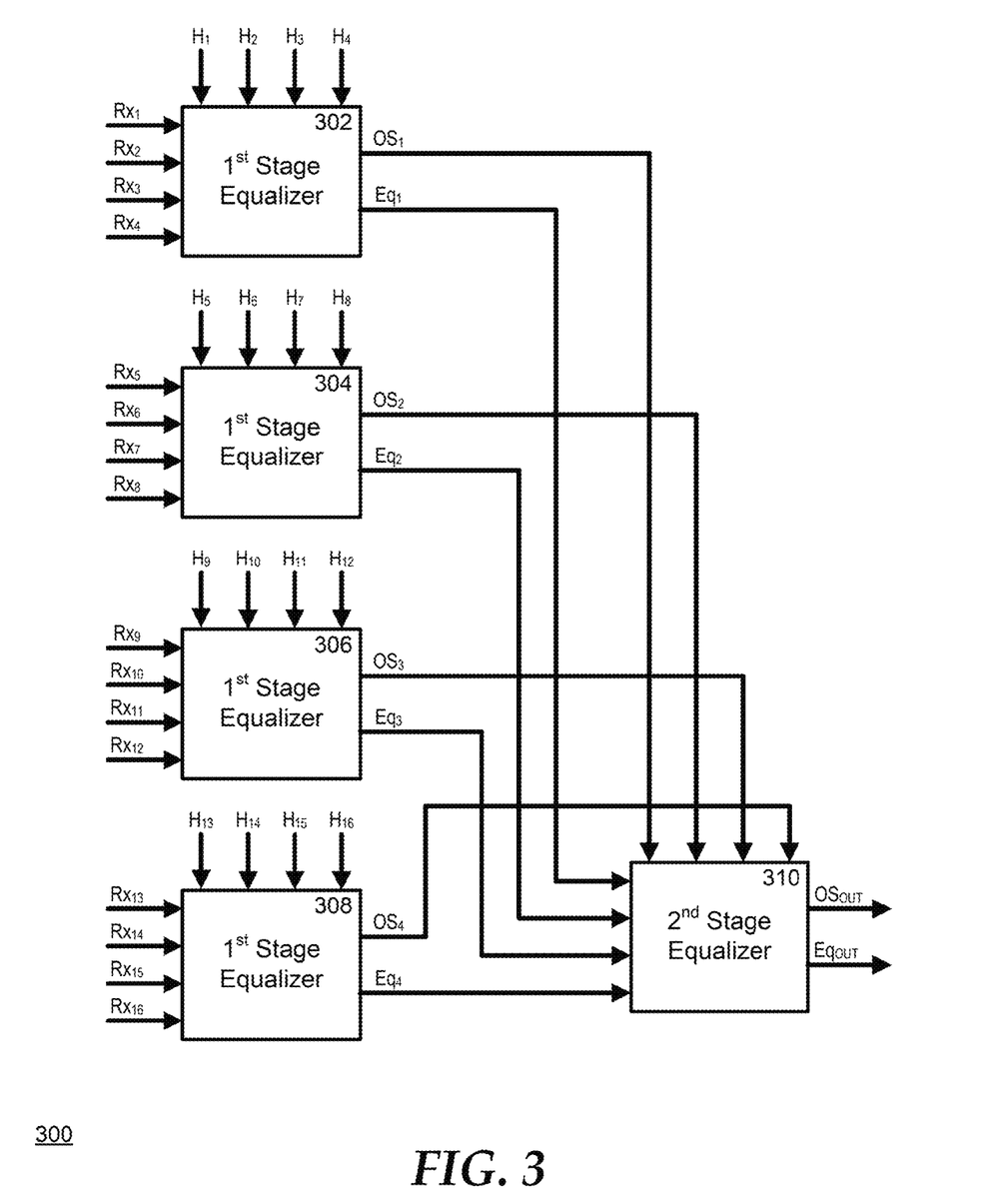
FIG. 3 is a block diagram of a multi-stage equalizer that uses small dimension equalizer circuits according to various embodiments of the present disclosure.

FIG. 3 illustrates an exemplary embodiment of a multi-stage equalizer 300 similar to multi-stage equalizer 230, and that provides two stages of equalization for 16 received radio signals from 16 antennas using equalizer circuits that equalize four (4) frequency-domain signals. Multi-stage Equalizer 300 includes first stage equalizer circuits 302, 304, 306, and 308, and a second stage equalizer circuit 310. Multi-stage equalizer 300 receives 16 frequency-domain signals (Rx$_1$, Rx$_2$, ..., Rx$_{16}$) from the 16 antennas, and the channel characteristic information associated with each antenna (H$_1$, H$_2$, ..., H$_{16}$).

In the first stage, equalizer circuit 302 is configured to receive four (4) frequency-domain signals (Rx$_1$, Rx$_2$, Rx$_3$, and Rx$_4$), and associated channel characteristic information (H$_1$, H$_2$, H$_3$, and H$_4$). Equalizer circuit 302 equalizes frequency-domain signals (Rx$_1$, Rx$_2$, Rx$_3$, and Rx$_4$) based upon the frequency-domain signals and channel characteristic information (H$_1$, H$_2$, H$_3$, and H$_4$), and generates a first stage equalized signal Eq$_1$ and output statistics OS$_1$, described below. Similarly, equalizer circuit 304 equalizes frequency-domain (Rx$_5$, Rx$_6$, Rx$_7$, and Rx$_8$) signals based on the frequency-domain signals and channel characteristic information (H$_5$, H$_6$, H$_7$, and H$_8$), and generates a first stage equalized signal Eq$_2$ and output statistics OS$_2$, equalizer circuit 306 equalizes frequency-domain signals (Rx$_9$, Rx$_{10}$, Rx$_{11}$, and Rx$_{12}$) based on the frequency-domain signals and channel characteristic information (H$_9$, H$_{10}$, H$_{11}$, and H$_{12}$), and generates a first stage equalized signal Eq$_3$ and output statistics OS$_3$, and equalizer circuit 308 equalizes frequency-domain signals (Rx$_{13}$, Rx$_{14}$, RX$_{15}$, and Rx$_{16}$) based on the frequency-domain signals and channel characteristic information (H$_{13}$, H$_{14}$, H$_{15}$, and H$_{16}$), and generates a first stage equalized signal Eq$_4$ and output statistics OS$_4$. In the second stage, equalizer circuit 310 is configured to receive four (4) frequency-domain signals (Eq$_1$, Eq$_2$, Eq$_3$, and Eq$_4$), and associated output statistics (OS$_1$, OS$_2$, OS$_3$, and OS$_4$), and the equalizer circuit equalizes the frequency-domain signals based upon the frequency-domain signals and the output statistics to provide a second stage equalized signal Eq$_{OUT}$.

In a particular embodiment, equalizer circuits 302, 304, 306, and 308 operate to equalize the frequency-domain signals and determine an estimated signal as:

$$\hat{x} = [H^H S^{-1} H + 1]^{-1} H^H S^{-1} \bar{y} \qquad \text{Equation 2}$$

where $\hat{x}$ is the estimated signal, H is the channel characteristic information, and S is a noise covariance that is calculated by a channel measurement or estimation. The output statistics are provided as:

$$\beta = \text{diag}\{[H^H S^{-1} H + 1]^{-1} H^H S^{-1} H\} \qquad \text{Equation 3}$$

and:

$$NV = \text{diag}\{[H^H S^{-1} H + 1]^{-1}\} \qquad \text{Equation 4}$$

where $\beta$ is the estimated amplitude attenuation and NV is the estimated error variance. In a particular embodiment, the channel characteristic information is determined based upon a channel training sequence. In another embodiment, the channel characteristic information is provided as an ongoing estimate of the signal path characteristics.

The skilled artisan will recognize that the teachings shown in equalizer 300 can be generalized, and that an equalizer can provide for different numbers of radio signals received on a greater or a lesser number of antennas, that the number of frequency-domain signals that can be equalized by a particular equalizer circuit is not fixed, and that equalizer circuits that can perform 10, 16, 32, or another number of equalizations can be utilized, as needed or desired. Moreover, where the number of equalized signals from a particular configuration of first stage equalizer circuits exceeds the number of frequency-domain signals to a particular second stage equalizer circuit, the second stage of equalization can include multiple equalizer circuits, each providing its own equalized signal and output statistics that feed into one or more third stage equalizer to provide third stage equalized signals and associated output statistics. Further, equalization stages of the, fourth, or greater, order can also be provided, as needed or desired. Further, it is not necessary that the number of frequency-domain signals that the equalizer circuits can equalize is the same for all equalizer circuits within a particular equalization stage, or between equalization stages, but a mix of different equalizer circuits can be configured as needed or desired. It will be further understood that the equalization performed and the output statistics generated by an equalizer circuit of the present disclosure may be performed by different methods, as known to the skilled artisan. Further, it will be understood that an equalizer circuit may receive the channel characteristic associated with the respective signals on a single input to the equalizer circuit, or on separate inputs to the equalizer circuit, as needed or desired.

Figure 4:
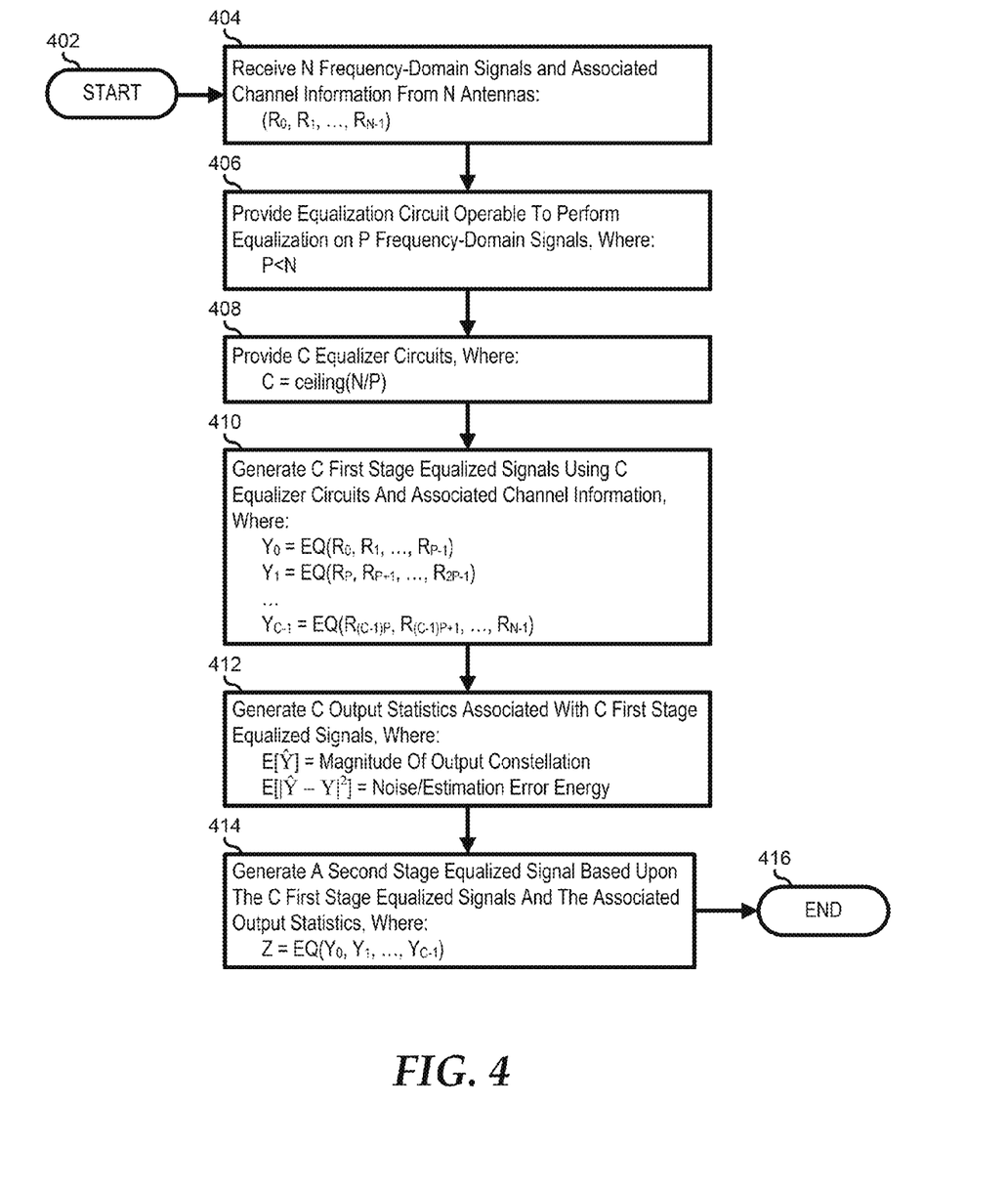
FIG. 4 is a flowchart illustrating a method for large dimension equalization using small dimension equalizer circuits according to an embodiment of the present disclosure.

FIG. 4 illustrates a method for large dimension equalization using small dimension equalizer circuits in a wireless communication network, starting at block 402. A receiver receives N frequency-domain signals (R$_0$, R$_1$, ..., R$_{N-1}$) from N antennas, and channel characteristic associated with the N frequency domain signals, in block 404. For example, receiver 200 can be part of a high-speed wireless data communication network, and can operate to receive 32 frequency-domain signals from 32 antennas in a Massive-MIMO configuration. Equalization circuits are provided in block 406, such that P frequency-domain signals are equalized by each equalizer circuit, where:

$$P < N \qquad \text{Equation 5.}$$

For example, an equalizer circuit can be configured to provide equalization to up to eight (8) received frequency-domain signals. "C" of the particular equalizer circuits are provided in bloc 408, where each of the C equalizer circuits equalizes N frequency-domain signals, where:

$$C = \text{ceiling}(N/P) \qquad \text{Equation 6.}$$

For example, to provide first stage equalization to 32 frequency-domain signals from 32 antennas using equalizer circuits that are configured to provide equalization to eight (8) frequency-domain signals, at least four (4) equalizer circuits are needed in the first stage.

The C equalizer circuits each generate a first stage equalized signal using the channel characteristic associated with each frequency-domain signal in block 410, where:

$$Y_0 = EQ(R_0, R_1, \ldots, R_{P-1}), \qquad \text{Equation 7}$$

$$Y_1 = EQ(R_P, R_{P+1}, \ldots, R_{2P-1}), \qquad \text{Equation 8}$$

$$\ldots$$

$$Y_{C-1} = EQ(R_{(C-1)P}, R_{(C-1)P+1}, \ldots, R_{N-1}), \qquad \text{Equation 9}$$

and where Y$_X$ is a first stage equalized signal from one of the C equalizer circuits. For example, the four (4) equalization circuits can generate an equalized signal based upon the received frequency-domain signals and channel characteristic.

Each of the C equalizer circuits generates output statistics associated with the equalized signal in block 412. The output statistics provide a statistical evaluation of the channel characteristic, and can include an output constellation magnitude E[$\hat{Y}$] and a noise/estimation error variance and magnitude of output E[|$\hat{Y}$−Y|$^2$].

Finally, a second stage equalized signal is generated based upon the C equalized signals and the associated output statistics through a second stage equalizer circuit in block 414, where:

$$Z=EQ(Y_0, Y_1, \ldots, Y_{C-1}) \quad \text{Equation 10,}$$

and the method ends in block 416.

The skilled artisan will recognize that the method of FIG. 4 can be generalized to provide for different numbers of frequency-domain signals received from a greater or a lesser number of antennas, that the number of frequency-domain signals that can be equalized by a particular equalizer circuit is not fixed, and further, equalization stages of the third, fourth, or greater, order can be provided, as needed or desired.

Figure 5:
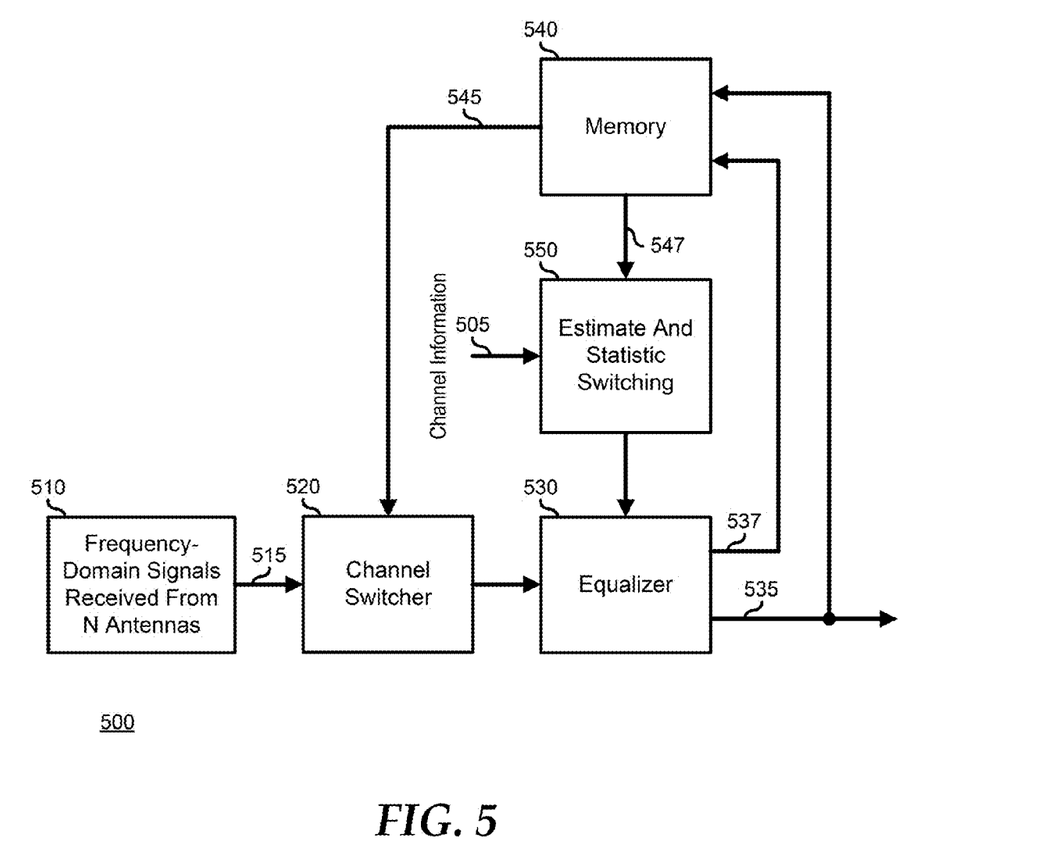
FIG. 5 is a block diagram of an equalizer that utilizes equalizer circuit reuse according an embodiment of the present disclosure.

FIG. 5 illustrates an exemplary embodiment of an equalizer 500 that reuses a single equalizer circuit that provides channel equalization on P signals to equalize N received radio signal from N antennas. Equalizer 500 includes a receiver module 510, a channel switcher 520, an equalizer circuit 530, a memory 540, and an estimate and statistics switcher (estimate switcher) 550. Receiver module 510 operates to receive N radio signals ($R_0, R_1, \ldots, R_N$) from the N antennas and to provide N frequency-domain signals 515 to channel switcher 520. Channel switcher 520 operates in a first stage mode to select a first set of up to P of the frequency-domain signals, and to provide the first set of frequency domain signals to equalizer circuit 530. At the same time, channel characteristic information 505 from the N antennas is provided to estimate switcher 550, and the estimate switcher operates in the first mode to select a first set of channel characteristic information associated with the first set of frequency-domain signals selected by channel switcher 520, and to provide the first set of channel characteristic information to equalizer circuit 530. When equalizer circuit 530 receives both the first set of frequency-domain signals and the first set of channel characteristic information, the equalizer circuit generates a first stage equalized signal 535 and output statistics 537 associated with the first stage equalized signal, and stores both the first stage equalized signal and the associated output statistics in memory 540. The first stage mode continues with channel switcher 520 successively selecting additional sets of up to P of frequency-domain signals 515 that are provided to equalizer circuit 530, with estimate switcher 550 selecting the associated sets of channel characteristic information 505 that are provided to the equalizer circuit, and with the equalizer circuit generating successive first stage equalized signals 535 and associated output statistics 537 and storing the first stage equalized signals and associated output statistics to memory 540, until all of the N frequency-domain signals 515 have been equalized.

In subsequent stages, channel switcher 520 operates to select sets of the stored first stage equalized signals 545 from memory 540, and to sequentially provide the sets of stored first stage equalized signals to equalizer circuit 530. Similarly, estimate switcher 550 operates to select the associated sets of the stored output statistics 547, and to provide the sets of stored output statistics to equalizer circuit 530. Equalizer circuit 530 then equalizes the received first stage equalized signals based upon the received first stage equalized signals and the associated output statistics, and to store the next stage equalized signals 535 and next stage output statistics 537 to memory 640. Each subsequent stage continues in like manner until all of the previous stage equalized signals have been processed. Then, in a final stage, when all previous stage signals have been equalized, equalizer circuit 530 provides a final equalization signal 535.

Figure 6:
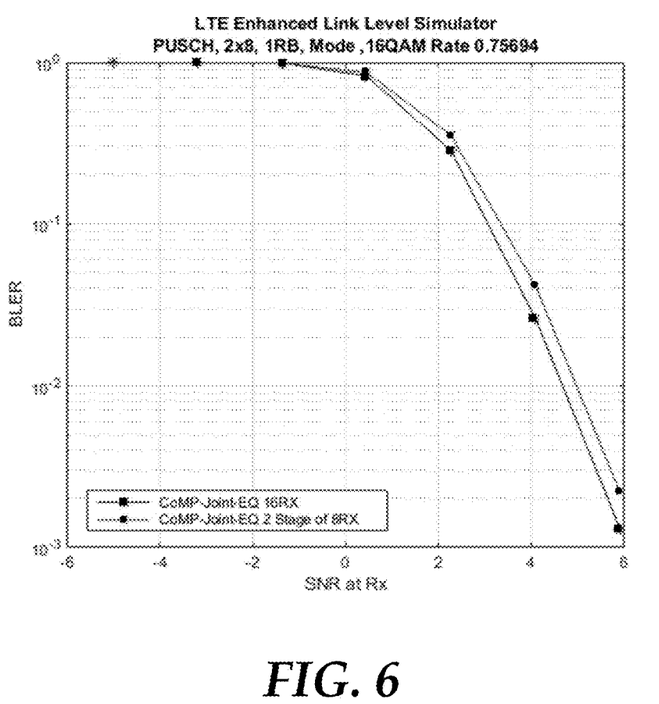
FIG. 6 is a graph illustrating a simulated result according to various embodiments of the present disclosure.

FIG. 6 is a graph illustrating a simulated result according to various embodiments of the present disclosure. Here, the graph shows a simulation for the effects of the experienced signal to noise ration (SNR), plotted on the X-axis, on the experienced block error rate (BLER), plotted on the Y-axis. Two cases are plotted. First, a simulated plot of 16 signals received on 16 antennas is plotted where a single equalizer circuit is used in a single stage, here plotted as squares. Second, a simulated plot of 16 signals received on 16 antennas is plotted where equalizer circuits that provide 8-channel equalization are used in two stages, here plotted as dots. It will be noted that the BLER for the first simulation is generally lower as a function of SNR than the corresponding BLER for the second simulation. However, the skilled artisan will note that the degradation in BLER that results from the second simulation may be within a design tolerance, and therefore, the use of multiple stage equalization may provide a more cost effective, while technically satisfactory solution for Massive-MIMO equalization.

Embodiments incorporating teachings of the present disclosure are shown and described with respect to the drawings presented herein. In an embodiment, a method includes receiving first, second, third, and fourth frequency-domain signals, generating at a first equalization circuit a first equalized signal based upon the first and second frequency-domain signals, generating at a second equalization circuit a second equalized signal based upon the third and fourth frequency-domain signals, and generating at a third equalization circuit a third equalized signal based upon the first and second equalized signals.

The first equalized signal can be further based upon first and second channel characteristics associated with the respective first and second frequency-domain signals, and the second equalized signal can be further based upon third and fourth channel characteristics associated with the respective third and fourth frequency-domain signals.

The method can further include generating first output statistics at the first equalization circuit based upon the first and second frequency-domain signals and the first and second channel characteristics, generating second output statistics at the second equalization circuit based upon the third and fourth frequency-domain signals and the third and fourth channel characteristics, where the third equalized signal is further based upon the first and second output statistics.

In a first case, the first output statistics can comprise a first magnitude of an output constellation of the first equalized signal, and the second output statistics can comprise a second magnitude of an output constellation of the second equalized signal.

In a second case, the first output statistics can comprise a first noise/estimation error variance of the first equalized signal, and the second output statistics can comprise a second noise/estimation error variance of the second equalized signal.

In a third case, the method can further include generating a fourth equalized signal at a fourth equalization circuit based upon the third equalized signal and a fifth equalized signal.

In a fourth case, the method can further include generating third output statistics at the third equalization circuit, where the third output statistics are based upon the first equalized signal, the second equalized signal, the first output statistics and the second output statistics, and where the fourth equalized signal is further based upon the third output statistics and fourth output statistics associated with the fifth equalized signal.

The method can further include receiving a training sequence, where the first channel characteristic, the second channel characteristic, the third and fourth channel characteristic are based upon the training sequence.

The method can further include generating the first channel characteristic based upon an estimate of a first signal path characteristic associated with the first frequency-domain signal, generating the second channel characteristic based upon an estimate of a second signal path characteristic associated with the second frequency-domain signal, generating the third channel characteristic based upon an estimate of a third signal path characteristic associated with the third frequency-domain signal, and generating the fourth channel characteristic based upon an estimate of a fourth signal path characteristic associated with the fourth frequency-domain signal.

The method can further include receiving the first, second, third, and fourth frequency-domain signals from a Multiple-Input Multiple-Output (MIMO) antenna array.

In another embodiment, an equalizer has a first equalizer circuit including a first signal input to receive a first frequency-domain signal, a second signal input to receive a second frequency-domain signal, and an equalized signal output to provide a first equalized signal based upon the first and second frequency-domain signals. The equalizer also has a second equalizer circuit including a first signal input to receive a third frequency-domain signal, a second signal input to receive a fourth frequency-domain signal, and an equalized signal output to provide a second equalized signal based upon the third and fourth frequency-domain signals. The equalizer also has a third equalizer circuit including a first signal input coupled to the equalized signal output of the first equalizer circuit to receive the first equalized signal, a second signal input coupled to the equalized signal output of the second equalizer circuit to receive the second equalized signal, and an equalized signal output to provide a third equalized signal based upon the first and second equalized signals.

The first equalizer circuit can further have a channel characteristic input to receive first and second channel characteristic associated with the respective first and second frequency-domain signals wherein the first equalized signal is further based upon the first and second channel characteristic, and an output statistics output to provide first output statistics based upon the first and second frequency-domain signals and the first and second channel characteristic, the second equalizer circuit can further have a channel characteristic input to receive third and fourth channel characteristic associated with the respective third and fourth frequency-domain signals wherein the second equalized signal is further based upon the third and fourth channel characteristic, and an output statistics output to provide second output statistics based upon the second and third frequency-domain signals and the second and third channel characteristic, and the third equalizer circuit can further have a channel characteristic input to receive the first and second output statistics wherein the third equalized signal is further based upon the first and second output statistics.

The first output statistics can include a first magnitude of an output constellation of the first equalized signal, and the second output statistics comprise a second magnitude of an output constellation of the second equalized signal.

The first output statistics can include a first noise/estimation error variance of the first equalized signal, and the second output statistics comprise a second noise/estimation error variance of the second equalized signal.

The equalizer can further have a fourth equalizer circuit including a first signal input coupled to the equalized signal output of the third equalizer circuit to receive the third equalized signal, a second signal input to receive a fourth equalized signal, and an equalized signal output to provide a fifth equalized signal based upon the third and fourth equalized signals.

The third equalizer circuit can further have an output statistics output to provide third output statistics based upon the first and second equalized signals and the first and second output statistics, and the fourth equalizer circuit can further have a channel characteristic input to receive the third output statistics and fourth output statistics associated with the fifth equalized signal wherein the fourth equalized signal is further based upon the third and fourth output statistics.

The first channel characteristic, the second channel characteristic, the third channel characteristic, and the fourth channel characteristic can be based upon a training sequence received from a transmitter.

The first channel characteristic can be based upon an estimate of a first signal path characteristic associated with the first frequency-domain signal, the second channel characteristic can be based upon an estimate of a second signal path characteristic associated with the second frequency-domain signal, the third channel characteristic can be based upon an estimate of a third signal path characteristic associated with the third frequency-domain signal, and the fourth channel characteristic can be based upon an estimate of a fourth signal path characteristic associated with the fourth frequency-domain signal.

The first, second, third, and fourth frequency-domain signals are received from a Multiple-Input Multiple-Output (MIMO) antenna array.

In another embodiment, a receiver includes N antennas, and an equalizer coupled to the N antennas. The equalizer has C first stage equalizer circuits, each first stage equalizer circuit including P inputs to receive P frequency-domain signals from a subset of the N antennas, and an output to provide a first stage equalized signal for the P frequency-domain signals, wherein the first stage equalized signal is based upon the P frequency-domain signals, wherein P<N, and wherein C>N/P. The equalizer further has a second stage equalizer circuit including C inputs to receive the first stage equalized signals from each of the C first stage equalizer circuits, and an output to provide a second stage equalized signal for the C first stage equalized signals, wherein the second stage equalized signal is based upon the C first stage equalized signals. The equalizer further has a data recovery module including an input to receive the second stage equalized signal, and an output to provide digital data based upon the second stage equalized signal.

It will be appreciated that for simplicity and clarity of illustration, elements illustrated in the Figures have not necessarily been drawn to scale. For example, the dimensions of some of the elements are exaggerated relative to other elements.

It will be appreciated that the devices disclosed herein can be implemented in various manners using various types of memory. In particular, the application of the equalization as described herein, is not limited to applications in the disclosed embodiments, but can be applied in other instances where signal equalization is needed or desired.

The preceding description in combination with the Figures was provided to assist in understanding the teachings disclosed herein. The discussion focused on specific implementations and embodiments of the teachings. This focus was provided to assist in describing the teachings, and should not be interpreted as a limitation on the scope or applicability of the teachings. However, other teachings can certainly be used in this application. The teachings can also be used in other applications, and with several different types of architectures.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute instructions, and can be provided by a microcode memory of the processing device.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method, comprising:
  receiving a first frequency-domain signal, a second frequency-domain signal, a third frequency-domain signal, and a fourth frequency-domain signal;
  generating, at a first equalization circuit, a first equalized signal based upon the first frequency-domain signal, the second frequency-domain signal, first channel characteristic associated with the first frequency-domain signal, and second channel characteristic associated with the second frequency-domain signal;
  generating, at the first equalization circuit, first output statistics based upon the first frequency-domain signal, the second frequency-domain signal, the first channel characteristic and the second channel characteristic;
  generating, at a second equalization circuit, a second equalized signal based upon the third frequency-domain signal, the fourth frequency-domain signal, third channel characteristic associated with the third frequency-domain signal, and fourth channel characteristic associated with the fourth frequency-domain signal;
  generating, at the second equalization circuit, second output statistics based upon the third frequency-domain signal, the fourth frequency-domain signal, the third channel characteristic and the fourth channel characteristic; and
  generating, at a third equalization circuit, a third equalized signal based upon the first equalized signal, the second equalized signal, the first output statistics, and the second output statistics.

2. The method of claim 1 wherein the first output statistics comprise a first magnitude of an output constellation of the first equalized signal, and the second output statistics comprise a second magnitude of an output constellation of the second equalized signal.

3. The method of claim 1, wherein the first output statistics comprise a first noise/estimation error variance of the first equalized signal, and the second output statistics comprise a second noise/estimation error variance of the second equalized signal.

4. The method of claim 1, further comprising:
  generating, at a fourth equalization circuit, a fourth equalized signal based upon the third equalized signal and a fifth equalized signal.

5. The method of claim 4, further comprising:
  generating, at the third equalization circuit, third output statistics based upon the first equalized signal, the second equalized signal, the first output statistics and the second output statistics;
  wherein the fourth equalized signal is further based upon the third output statistics and fourth output statistics associated with the fifth equalized signal.

6. The method of claim 1, further comprising:
  receiving a training sequence, wherein the first channel characteristic, the second channel characteristic, the third channel characteristic, and the fourth channel characteristic are based upon the training sequence.

7. The method of claim 1, further comprising:
  generating the first channel characteristic based upon an estimate of a first signal path characteristic associated with the first frequency-domain signal;
  generating the second channel characteristic based upon an estimate of a second signal path characteristic associated with the second frequency-domain signal;

generating the third channel characteristic based upon an estimate of a third signal path characteristic associated with the third frequency-domain signal; and generating the fourth channel characteristic based upon an estimate of a fourth signal path characteristic associated with the fourth frequency-domain signal.

8. The method of claim 1, further comprising:

receiving the first frequency-domain signal, the second frequency-domain signal, the third frequency-domain signal, and the fourth frequency-domain signal from a Multiple-Input Multiple-Output (MIMO) antenna array.

9. An equalizer, comprising:

a first equalizer circuit including a first signal input to receive a first frequency-domain signal, a second signal input to receive a second frequency-domain signal, a channel characteristic input to receive first and second channel characteristic associated with the respective first and second frequency-domain signals, an equalized signal output to provide a first equalized signal based upon the first and second frequency-domain signals and upon the first and second channel characteristic, and an output statistics output to provide first output statistics based upon the first and second frequency-domain signals and the first and second channel characteristic;

a second equalizer circuit including a first signal input to receive a third frequency-domain signal, a second signal input to receive a fourth frequency-domain signal, a channel characteristic input to receive third and fourth channel characteristic associated with the respective third and fourth frequency-domain signals, an equalized signal output to provide a second equalized signal based upon the third and fourth frequency-domain signals and upon the third and fourth channel characteristic, and an output statistics output to provide second output statistics based upon the second and third frequency-domain signals and the second and third channel characteristic; and a third equalizer circuit including a channel characteristic input to receive the first and second output statistics, a first signal input coupled to the equalized signal output of the first equalizer circuit to receive the first equalized signal, a second signal input coupled to the equalized signal output of the second equalizer circuit to receive the second equalized signal, and an equalized signal output to provide a third equalized signal based upon the first and second equalized signals and upon the first and second output statistics.

10. The equalizer of claim 9, wherein the first output statistics comprise a first magnitude of an output constellation of the first equalized signal, and the second output statistics comprise a second magnitude of an output constellation of the second equalized signal.

11. The equalizer of claim 9, wherein the first output statistics comprise a first noise/estimation error variance of the first equalized signal, and the second output statistics comprise a second noise/estimation error variance of the second equalized signal.

12. The equalizer of claim 9, further comprising:

a fourth equalizer circuit including a first signal input coupled to the equalized signal output of the third equalizer circuit to receive the third equalized signal, a second signal input to receive a fourth equalized signal, and an equalized signal output to provide a fifth equalized signal based upon the third and fourth equalized signals.

13. The equalizer of claim 12, wherein:

the third equalizer circuit further includes an output statistics output to provide third output statistics based upon the first and second equalized signals and the first and second output statistics; and the fourth equalizer circuit further includes a channel characteristic input to receive the third output statistics and fourth output statistics associated with the fifth equalized signal wherein the fourth equalized signal is further based upon the third and fourth output statistics.

14. The equalizer of claim 9, wherein the first channel characteristic, the second channel characteristic, the third channel characteristic, and the fourth channel characteristic are based upon a training sequence received from a transmitter.

15. The equalizer of claim 9, wherein the first channel characteristic is based upon an estimate of a first signal path characteristic associated with the first frequency-domain signal, the second channel characteristic is based upon an estimate of a second signal path characteristic associated with the second frequency-domain signal, the third channel characteristic is based upon an estimate of a third signal path characteristic associated with the third frequency-domain signal, and the fourth channel characteristic is based upon an estimate of a fourth signal path characteristic associated with the fourth frequency-domain signal.

16. The equalizer of claim 9, wherein the first, second, third, and fourth frequency-domain signals are received from a Multiple-Input Multiple-Output (MIMO) antenna array.

17. A receiver, comprising:

N antennas; and an equalizer coupled to the N antennas, the equalizer comprising:

C first stage equalizer circuits, each first stage equalizer circuit including P inputs to receive P frequency-domain signals from a subset of the N antennas, and an output to provide a first stage equalized signal for the P frequency-domain signals, wherein the first stage equalized signal is based upon the P frequency-domain signals, wherein $P<N$, —wherein $C>N/P$, and wherein N, C, and P are integers;

a second stage equalizer circuit including C inputs to receive the first stage equalized signals from each of the C first stage equalizer circuits, and an output to provide a second stage equalized signal based upon the C first stage equalized signals, wherein the second stage equalized signal is based upon the C first stage equalized signals; and a data recovery module including an input to receive the second stage equalized signal, and an output to provide digital data based upon the second stage equalized signal.

\* \* \* \* \*